US012084194B2

United States Patent
Emerson et al.

(10) Patent No.: US 12,084,194 B2
(45) Date of Patent: Sep. 10, 2024

(54) FUEL STORAGE LEAK MITIGATION FOR AIRCRAFT

(71) Applicant: Hamilton Sundstrand Corporation, Charlotte, NC (US)

(72) Inventors: Sean C. Emerson, Broad Brook, CT (US); Paul Papas, West Hartford, CT (US); Joseph Turney, Amston, CT (US); Ram Ranjan, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 275 days.

(21) Appl. No.: 17/470,392

(22) Filed: Sep. 9, 2021

(65) Prior Publication Data

US 2023/0077242 A1    Mar. 9, 2023

(51) Int. Cl.
*B64D 37/32*    (2006.01)
*B64D 37/30*    (2006.01)

(52) U.S. Cl.
CPC .............. *B64D 37/32* (2013.01); *B64D 37/30* (2013.01)

(58) Field of Classification Search
CPC ........ B64D 37/04; B64D 37/30; B64D 37/32; B64D 37/34; B64D 37/005
See application file for complete search history.

(56) References Cited

U.S. PATENT DOCUMENTS 1,347,057 A * 7/1920 Ross .................. A62C 3/06
169/46

2,309,813 A * 2/1943 Whiting ................. B64D 37/34
62/48.1

(Continued)

FOREIGN PATENT DOCUMENTS

WO    2012045035 A2    4/2012
WO    2014105335 A1    7/2014

OTHER PUBLICATIONS

Tamburelli, Luca. "The Tupolev Which Flew on Hydrogen 32 Years Ago." Private Jets Blog l, Sep. 27, 2020, blog.privatejetfinder.com/tu-155-hydrogen/. (Year: 2020).*

(Continued)

*Primary Examiner* — Michael C Zarroli
*Assistant Examiner* — Ka Chun Leung
(74) *Attorney, Agent, or Firm* — CANTOR COLBURN LLP

(57) ABSTRACT

Aircraft fuel system including a fuel vessel containing a non-mixture fuel. A protective vessel is arranged about the fuel vessel such that the fuel vessel is contained within the protective vessel and a protective space is defined between an outer surface of a vessel wall of the fuel vessel and an inner surface of a vessel wall of the protective vessel. At least one mounting structure fixedly positions the fuel vessel within the protective vessel. A fuel consumption device configured to consume the non-mixture fuel. A fuel output fluidly connects an interior of the fuel vessel to the fuel consumption device, the fuel output being fluidly isolated from the protective space. A relief output fluidly connects the protective space to a relief flow path, the relief output and relief flow path configured to vent gas from the protective space and remove any non-mixture fuel from the protective space.

18 Claims, 4 Drawing Sheets

(56) References Cited

U.S. PATENT DOCUMENTS

| | | | | |
|---|---|---|---|---|
| 2,889,955 | A | * | 6/1959 | Naulty .................... A62C 3/08 |
| | | | | 244/135 R |
| 3,208,622 | A | | 9/1965 | Trentham et al. |
| 3,243,150 | A | | 3/1966 | Woodcock |
| 4,481,778 | A | | 11/1984 | Reinker et al. |
| 7,086,236 | B2 | * | 8/2006 | Fischer ............ B60K 15/03006 |
| | | | | 62/48.1 |
| 7,624,946 | B2 | | 12/2009 | Schoene |
| 7,815,148 | B2 | | 10/2010 | Kwok |
| 9,079,489 | B2 | | 7/2015 | McAlister |
| 11,040,306 | B2 | | 6/2021 | Van Hassel |
| 2002/0047015 | A1 | * | 4/2002 | Distelhoff ........ B60K 15/03177 |
| | | | | 220/562 |
| 2014/0026597 | A1 | * | 1/2014 | Epstein ................ F17C 13/005 |
| | | | | 62/53.2 |
| 2015/0344145 | A1 | * | 12/2015 | Epstein .................... F17C 3/00 |
| | | | | 244/135 C |

OTHER PUBLICATIONS

Extended European Search Report; EP Application No. 22192846.8-1004; issued Jan. 25, 2023; 8 pages.

* cited by examiner

FUEL STORAGE LEAK MITIGATION FOR AIRCRAFT

TECHNICAL FIELD

The present disclosure relates generally to aircraft systems, and more specifically to leak mitigation for fuel storage onboard aircraft.

BACKGROUND

Conventional aircraft must inert a vapor space above jet fuel in fuel tanks to mitigate the risk of fires and explosions. These tanks are typically vented to the outside air to control their pressure. However, the transition to using alternative fuels, such as hydrogen or ammonia, means the risk mitigation strategy must change. For example, tanks containing hydrogen or ammonia may not be able to be vented directly to the atmosphere. Additionally, hydrogen or hydrogen-enriched fuels have wider flammability limits and lower minimum ignition energies than conventional jet fuel, requiring accommodation to prevent ignition and flame propagation. Similarly, although ammonia has a narrower flammability limit, it is a toxic fuel and thus cannot be released to ambient when an aircraft is on the ground. Accordingly, improved fuel systems and storage systems thereof may be useful for further aircraft configurations.

BRIEF SUMMARY

According to some embodiments, aircraft fuel systems are described. The aircraft fuel systems include a fuel vessel containing a non-mixture fuel, a protective vessel arranged about the fuel vessel such that the fuel vessel is contained within the protective vessel and a protective space is defined between an outer surface of a vessel wall of the fuel vessel and an inner surface of a vessel wall of the protective vessel, at least one mounting structure fixedly positioning the fuel vessel within the protective vessel, a fuel consumption device configured to consume the non-mixture fuel, a fuel output fluidly connecting an interior of the fuel vessel to the fuel consumption device, the fuel output fluidly isolated from the protective space, and a relief output fluidly connecting the protective space to a relief flow path, the relief output and relief flow path configured to vent gas from the protective space and remove any non-mixture fuel from the protective space.

In addition to one or more of the features described above, or as an alternative, further embodiments of the aircraft fuel systems may include that the non-mixture fuel is cryogenic liquid hydrogen or liquified natural gas.

In addition to one or more of the features described above, or as an alternative, further embodiments of the aircraft fuel systems may include that the non-mixture fuel is pressurized gaseous hydrogen.

In addition to one or more of the features described above, or as an alternative, further embodiments of the aircraft fuel systems may include that the non-mixture fuel is pressurized ammonia or liquid ammonia at ambient pressure.

In addition to one or more of the features described above, or as an alternative, further embodiments of the aircraft fuel systems may include that the protective space is a vacuum.

In addition to one or more of the features described above, or as an alternative, further embodiments of the aircraft fuel systems may include that the protective space is filled with an inert gas.

In addition to one or more of the features described above, or as an alternative, further embodiments of the aircraft fuel systems may include an inerting agent supply device configured to generate inert gas and supply said inert gas into the protective space.

In addition to one or more of the features described above, or as an alternative, further embodiments of the aircraft fuel systems may include that the at least one mounting structure comprises a heat exchanger configured to transfer heat from the fuel vessel to the inert gas.

In addition to one or more of the features described above, or as an alternative, further embodiments of the aircraft fuel systems may include an auxiliary system configured to receive the inert gas from the protective space.

In addition to one or more of the features described above, or as an alternative, further embodiments of the aircraft fuel systems may include that the auxiliary system is a fire suppression system.

In addition to one or more of the features described above, or as an alternative, further embodiments of the aircraft fuel systems may include that the fuel consumption system is one of a fuel cell or a non-mixture fuel burning engine.

In addition to one or more of the features described above, or as an alternative, further embodiments of the aircraft fuel systems may include a second fuel vessel containing a second, different non-mixture fuel.

In addition to one or more of the features described above, or as an alternative, further embodiments of the aircraft fuel systems may include that the relief flow path includes a relief valve, a flame arrestor, and an external vent.

In addition to one or more of the features described above, or as an alternative, further embodiments of the aircraft fuel systems may include that the relief flow path includes a combustor configured to combust vented non-mixture fuel from the protective space prior to venting of the combusted non-mixture fuel.

According to some embodiments, aircraft are described. The aircraft include a fuselage, wings, and an aircraft fuel system. The aircraft fuel system includes a fuel vessel containing a non-mixture fuel, a protective vessel arranged about the fuel vessel such that the fuel vessel is contained within the protective vessel and a protective space is defined between an outer surface of a vessel wall of the fuel vessel and an inner surface of a vessel wall of the protective vessel, at least one mounting structure fixedly positioning the fuel vessel within the protective vessel, a fuel consumption device configured to consume the non-mixture fuel, a fuel output fluidly connecting an interior of the fuel vessel to the fuel consumption device, the fuel output fluidly isolated from the protective space, and a relief output fluidly connecting the protective space to a relief flow path, the relief output and relief flow path configured to vent gas from the protective space and remove any non-mixture fuel from the protective space. The fuel consumption system is installed to at least one of the fuselage and the wings.

In addition to one or more of the features described above, or as an alternative, further embodiments of the aircraft may include that the non-mixture fuel is one of hydrogen or ammonia.

In addition to one or more of the features described above, or as an alternative, further embodiments of the aircraft may include that the fuel consumption system is one of a fuel cell system configured to generate power for flight of the aircraft and a non-mixture fuel-fuel burning engine configured to generate power for flight of the aircraft.

In addition to one or more of the features described above, or as an alternative, further embodiments of the aircraft may include a second fuel vessel containing a second, different non-mixture fuel.

In addition to one or more of the features described above, or as an alternative, further embodiments of the aircraft may include that the protective space is filled with an inert gas and the at least one mounting structure comprises a heat exchanger configured to transfer heat from the fuel vessel to the inert gas.

In addition to one or more of the features described above, or as an alternative, further embodiments of the aircraft may include that the relief flow path includes a relief valve, a flame arrestor, and an external vent.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
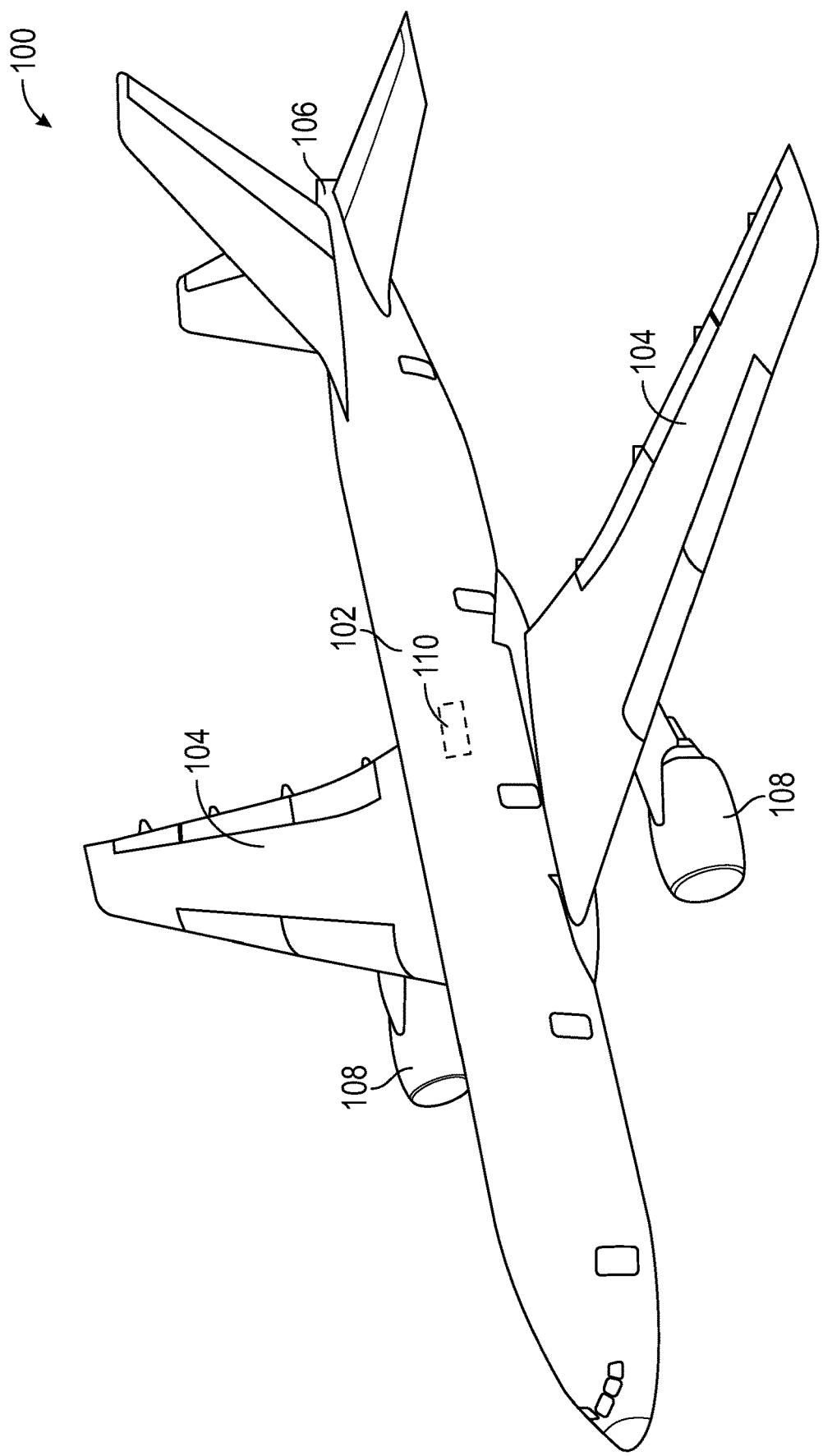
FIG. 1 is a schematic illustration of an aircraft that may incorporate embodiments of the present disclosure.

Referring to FIG. 1, a schematic illustration of an aircraft 100 that may incorporate embodiments of the present disclosure is shown. The aircraft 100 includes a fuselage 102, wings 104, and a tail 106. In this illustrated embodiment, the aircraft 100 includes wing-mounted aircraft propulsion systems 108. The wing-mounted aircraft propulsion systems 108 may be convention gas turbine engines, fuel-cell powered electrical propulsion systems, or other propulsion systems as known in the art. In other configurations, aircraft employing embodiments of the present disclosure may include fuselage-mounted and/or tail-mounted configurations. Further, any number of fuel-cell powered propulsion and/or power generation systems, such as an auxiliary or emergency power system, may be employed, from one to four or more, depending on the aircraft configuration and power and thrust needs thereof. The propulsion systems 108 may be used to generate thrust for flight and may also be used to generate onboard electrical power, particularly in a fuel cell configuration. The aircraft 100 may also include auxiliary power units 110 that may be fuel cell based, or otherwise configured to generate power. In other embodiments, the propulsion systems 108 may be configured to burn or consume fuel to drive a shaft and fan similar to conventional gas turbine engines and the like.

Fuel cell based power systems (e.g., for power generation and/or for propulsion) and/or combustion engines (e.g., for power generation and/or for propulsion) may employ various types of fuel, including hydrogen and/or ammonia. The fuel cell systems may employ a catalytic reaction to consume the fuel whereas the combustion systems may employ air mixing and ignition for consumption of the fuels. In either configuration, the aircraft must include onboard storage of the fuel to be consumed.

Figure 2:
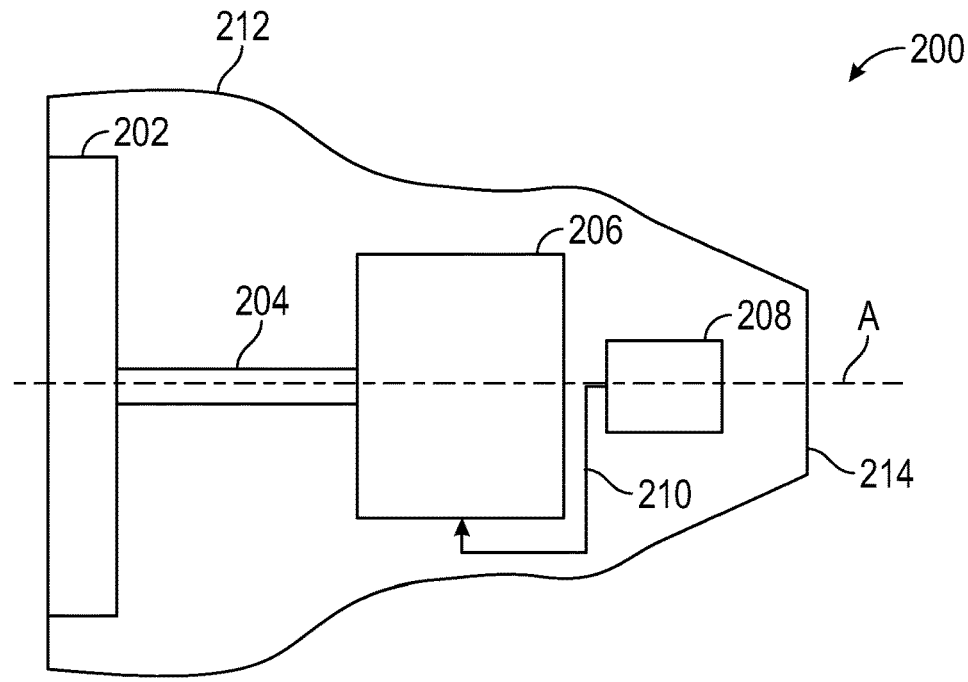
FIG. 2 is a schematic diagram of an aircraft propulsion system for an aircraft in accordance with an embodiment of the present disclosure.

For example, turning now to FIG. 2, a schematic diagram of an aircraft propulsion system 200 in accordance with an embodiment of the present disclosure is shown. The aircraft propulsion system 200 is a non-combustion system, and includes a fan 202, a drive shaft 204, a motor 206, and an aircraft power generation system 208. The fan 202 is operably coupled to and configured to be rotated by the drive shaft 204 to generate thrust, similar to a fan and fan section of a conventional gas turbine engine. However, in the fuel cell configuration of FIG. 2, there is no core flow path and no turbine section(s) driven by combusted and expanded gas. In contrast, the drive shaft 204 that drives rotation of the fan 202 is operably coupled to and driven by the motor 206. The motor 206 may be an electric motor that converts electrical power to mechanical (rotational) energy. The motor 206 receives power from the aircraft power generation system 208 along an electrical connection 210. The aircraft propulsion system 200 may be configured to operate within similar limits and envelops as a conventional gas turbine engine.

The fan 202, the drive shaft 204, and the motor 206 may be arranged along a propulsion system central longitudinal axis A. The fan 202, the drive shaft 204, the motor 206, and the aircraft power generation system 208 can be mounted, installed, or otherwise housed within a propulsion system housing 212 (e.g., a nacelle for wing-mounted applications) which includes an exit nozzle 214 for directing an airflow therethrough for the purpose of driving flight of an aircraft (e.g., generating thrust). The propulsion system housing 212 may be configured to be mounted to a wing or fuselage of an aircraft.

The aircraft power generation system 208 may be a fuel cell or similar power source (e.g., a solid oxide fuel cell). The aircraft power generation system 208 can be configured to not only power the motor 206 but also may be used as a power source for other propulsion system components and/or other aircraft electrical systems and components. In one non-limiting example, the aircraft power generation system 208 may be configured to output about 1 to about 10 MW electrical power. In accordance with embodiments of the present disclosure, the aircraft power generation systems may be configured to generate at least 100 kW of electrical power (e.g., less power may be used if the system is not used for propulsion). It will be appreciated that when used as a propulsion configuration, the aircraft power generation systems described herein are configured to generate, at least, sufficient power to drive the fan 202 and provide sufficient thrust and propulsion for flight at cruise altitudes. The amount of electrical power may be selected for a given aircraft configuration (e.g., size, operating envelope requirements, etc.).

Whether used for propulsion or only onboard electrical power, the aircraft power generation system 208 may be configured to combine hydrogen (e.g., liquid, compressed, supercritical, etc.) or other organic fluids as a fuel source using a fuel cell for generation of electricity. In some embodiments, in operation, hydrogen may be heated by fuel cell waste heat (e.g., water output) via a heat exchanger and then expanded through a turbine connected to a generator to extract some electric power from the hydrogen before it is used in the fuel cell. The hydrogen can also be used as the cold sink to cool aircraft environmental control system working fluids and/or provide other onboard thermal management, prior to being supplied to the fuel cell. In some embodiments, the fuel cell of the aircraft power generation system 208 can be configured to provide base electric power (e.g., suited for cruise operation). In some non-limiting configurations, some fuel (hydrogen) may be directed to bypass the fuel cell and be used in a small gas turbine to generate additional power for take-off and climb peak power needs.

Figure 3:
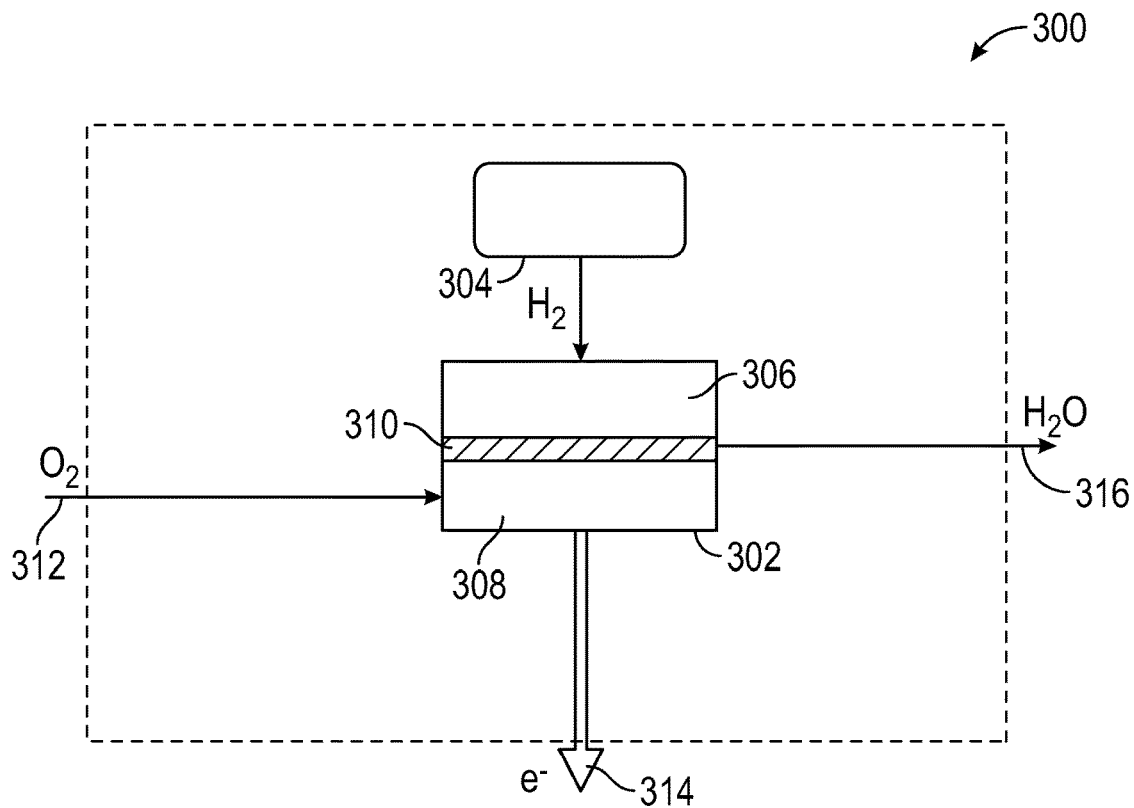
FIG. 3 is a schematic diagram of an aircraft power generation system in accordance with an embodiment of the present disclosure.

Turning now to FIG. 3, a schematic diagram of an aircraft power generation system 300 in accordance with an embodiment of the present disclosure is shown. The aircraft power generation system 300 includes a fuel cell 302 and a fuel source 304 (such as a hydrogen fuel source). The fuel cell 302 is configured to generate electricity, as will be appreciated by those of skill in the art (e.g., a solid oxide fuel cell). In this illustrative configuration, the fuel cell 302 includes an anode 306, a cathode 308, and an electrolyte membrane 310 arranged therebetween. The fuel cell 302 is supplied hydrogen ($H_2$) from the fuel source 304. The fuel source 304 may be a container or tank that houses liquid, compressed, supercritical fluid (e.g., the hydrogen in this example). The fuel cell 302 is supplied with oxygen ($O_2$) from an oxygen source at an inlet 312. In some embodiments, the $O_2$ may be supplied from ambient air, such as using an intake or scoop on a housing assembly, as will be appreciated by those of skill in the art. The $O_2$ and the $H_2$ are combined within the fuel cell 302 across the electrolyte membrane 310, which frees electrons for electrical power output 314. The combined $O_2$ and $H_2$ results in the formation of water ($H_2O$), which may be passed through an outlet 316 and dumped overboard, supplied into an onboard water tank, or otherwise used onboard an aircraft, as will be appreciated by those of skill in the art. For example, in one non-limiting embodiment, the water may be injected into a supplementary take-off gas turbine compressor for mass flow augmentation.

The electrical power output 314 may be electrically connected to a motor that is configured to drive a drive shaft and a fan of a propulsion system to generate thrust (e.g., as shown in FIG. 2). The electrical power output 314 may also or alternatively be electrically connected to other electrical systems of a propulsion system and/or aircraft system(s), as will be appreciated by those of skill in the art to provide electrical power thereto.

In conventional aircraft systems, a vapor space above jet fuel in the fuel tanks will be filled with an inert gas to mitigate the risk of flame propagation or explosions. These tanks are typically vented to the outside air to control their pressure. However, using cryogenic hydrogen ($H_2$), or an alternative fuel such as ammonia ($NH_3$) (e.g., pressurized ammonia or liquid ammonia at ambient pressure) or other non-mixture fuels, instead of jet fuel means the risk mitigation strategy must change. For example, tanks containing cryogenic fuels cannot be vented to the atmosphere. Further, $H_2$-enriched fuels have wider flammability limits (FL) as compared to conventional fuels. In contrast $NH_3$ fuel, having narrower FL than $H_2$, is also toxic and poses a risk of human exposure when released on the ground. Accordingly, prevention of such leaks from cryogenic fuel storage onboard aircraft is advantageous. The cryogenic fuels may be consumed in fuel cell systems, as described above, or may be combusted in a combustion chamber to drive a shaft, as done in conventional jet fuel gas turbine engines.

Non-mixture fuels, as employed by embodiments of the present disclosure, are fuels that are, at least, stored as a pure compound, such as just $H_2$ or just $NH_3$, within a tank. The use or consumption of the fuel may be as the pure state (e.g., catalyzing or burning $H_2$) or may be mixed downstream from the tank in order to be consumed. For example, in an ammonia ($NH_3$) system, the ammonia may be stored in a tank onboard an aircraft, as described herein, and then converted or cracked into a mixture of ammonia, hydrogen, and nitrogen. In other embodiments, different fuels from different tanks may be sourced to then be mixed upstream of the fuel consumption device. As such, the term "non-mixture fuel" as used herein refers to the stored, in-tank state of the fuel, and not necessarily to the state of the fuel at the time of consumption within a consumption device.

Cryogenic fuels, such as $H_2$ and $NH_3$, can be stored as liquids but used as fuels in a gaseous state (i.e., transitions from liquid to gas prior to consumption). Hydrogen, as a fuel, may also be stored as a high-pressure gas. Under ambient conditions, the lower flammability limit (LFL) $H_2$ is approximately 4% (by volume in air). The LFL of ammonia is approximately 14.8%. The upper flammability limit (UFL) for $H_2$ is 75% and for $NH_3$ is 33.5%. Ammonia also poses a toxicity risk when released. In some embodiments, ammonia may be stored as a liquid at room or ambient temperatures (non-cryogenic temperatures) but may require a pressure vessel to contain such a liquid. As described herein, the systems are configured to contain a fuel at high pressure (e.g., 150 psi or greater) and/or low temperature (e.g., 298 K or less, 240 K or less, 120 K or less, etc.). For example, liquid hydrogen may be stored at 20 K within a pressure vessel, pressurized hydrogen may be stored at higher temperature but at high pressures such as 4,000 psi or greater, and liquid ammonia may be stored at room temperatures as a liquid but contained at pressures of 150 psi or greater. The fuels stored in accordance with embodiments of the present disclosure may be referred to herein as "non-mixture fuels." That is, the fuels are completely or substantially pure fuels of a single compound (e.g., hydrogen, ammonia, liquified methane, and the like) when stored in a fuel tank or storage tank. In some configurations, these fuels may be consumed directly through combustion or catalytic reactions, but do not comprise a mixture of different compounds in the stored state. As noted above, multiple non-mixture fuels may be stored in separate tanks, and then combined prior to being supplied into a fuel consumption device.

Enclosing a primary non-mixture fuel storage tank within another vessel enables a barrier layer or cavity to provide protection against leaks of the non-mixture fuels. For example, a void between a primary storage tank and a protective vessel can be filled with inert or low oxygen ($O_2$) content gas or may be a vacuum. In configurations that employ a vacuum, leaks may be detected by monitoring pressure with sensors and identifying leaks through pressure rises from the vacuum level. As a result, any non-mixture fuel that leaks into the space between the two structures can be diluted to levels below the LFL and/or identified and addressed. In some embodiments, the inert gas can be $O_2$-depleted air or carbon dioxide ($CO_2$) that can also be used as a fire suppressant. Further, in some embodiments of the present disclosure, the external protective vessel can include a heat exchanger to enable thermal transfer between the non-mixture fuel and the inert gas. In some such embodiments, the heat exchanger(s) can be configured with microchannels to reduce weight. In some embodiments, a relief valve, flame arrestor, and optional catalytic combustor can allow safe venting of the non-mixture fuel outside the aircraft, when necessary.

In some embodiments, the non-mixture fuel lines of the system could be double-walled with the outer protective line/tube being vacuum insulated or incorporating a gas recovery line that can be purged with inert gases such as nitrogen ($N_2$) or carbon dioxide ($CO_2$) and connected to a fuel tank vent. Open vent lines can contain undesirable oxygen levels, and thus, these lines may be equipped with back pressure valves to prevent oxygen from entering the non-mixture fuel system and discharged only when certain pressure levels are reached.

A refrigerant could also be used as the inert agent and integrated as part of a vapor compression cycle on board the aircraft. Carbon dioxide ($CO_2$) or other non-flammable refrigerant compounds could be employed to transfer heat from or to the fuel tank and then be used as a cold source elsewhere in the aircraft, such as in a condenser. Ground leaks of non-mixture fuels, such as ammonia ($NH_3$), can pose toxicity as well as fire hazards.

Figure 4:
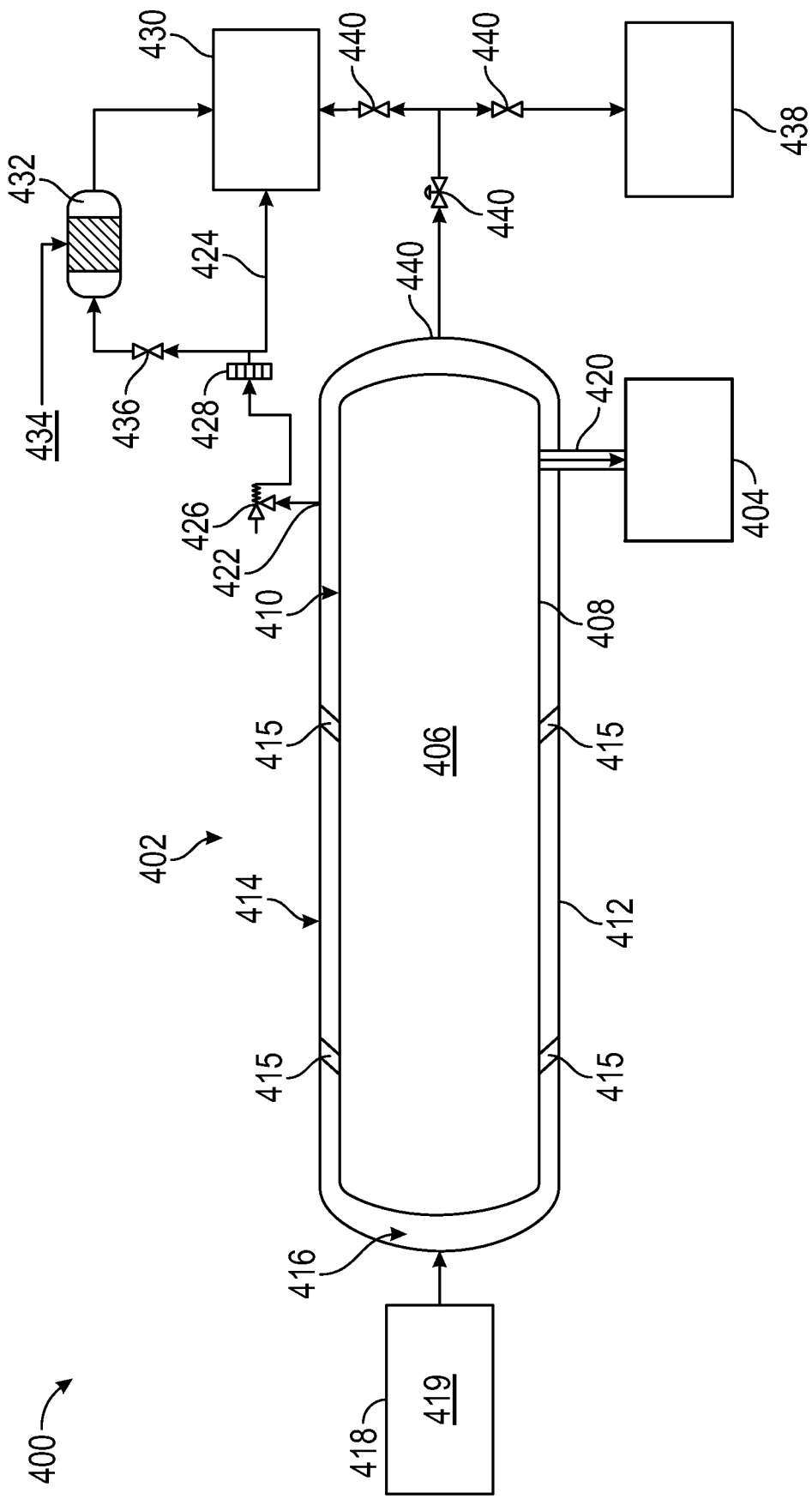
FIG. 4 is a schematic diagram of an aircraft fuel system in accordance with an embodiment of the present disclosure.

Turning now to FIG. 4, an aircraft fuel system 400 in accordance with an embodiment of the present disclosure is shown. The aircraft fuel system 400 includes a fuel tank system 402 fluidly connected to a fuel consumption device 404 (e.g., a fuel cell, combustion engine, or the like). The fuel consumption device 404 may be configured to generate power and, in some embodiments, may be configured to consume one or more non-mixture fuels for generating power or thrust for flight of the aircraft. The fuel tank system 402 contains a non-mixture fuel 406, such as hydrogen, ammonia, or liquified methane stored at high pressure and/or low temperature. The fuel tank system 402 may be configured to store the non-mixture fuels at temperatures ranging from 20 K to room temperature and 1 bar pressure or greater, depending upon the specific non-mixture fuel. The fuel consumption device 404 may be a fuel cell, a hydrogen burning engine, an ammonia burning engine, an ammonia/hydrogen burning engine, or other type of consumption device.

The fuel tank system 402, in this embodiment, includes a fuel vessel 408 having a respective vessel wall 410 and a protective vessel 412 having a respective vessel wall 414. The fuel vessel 408 is arranged within the protective vessel 412 and affixed together by one or more mounting structures 415, such as struts or other mounting mechanisms, as will be appreciated by those of skill in the art. A protective space 416 is defined between the vessel wall 410 of the fuel vessel 408 and the vessel wall 414 of the protective vessel 412. In some embodiments, the protective space 416 may be evacuated to have a vacuum space between the two vessels 408, 412. The vacuum space can provide thermal insulation to keep the fuel in a liquified state (e.g., for cryogenic hydrogen in the fuel vessel 408). Low thermal conductivity composites, such as thermoplastics or carbon matrix composites, as well as metals may be used as materials for the fuel vessel 408 and/or the protective vessel 410. In other embodiments, the protective space 416 may be filled with an inert or low oxygen content gas. In some such embodiments, an inerting agent supply device 418 may be fluidly coupled to the protective space 416 to provide inerting agent 419 therein. The inerting agent supply device 418 may be, for example and without limitation, an on-board inert gas generation system (OBIGGS), a $CO_2$ or other inert gas tank, a catalytic inerting system that catalyzes a hydrocarbon fuel to generate an inert gas, and the like. In some embodiments, other or additional flame retardant insulation materials may be used in the protective space 416 to provide additional thermal insulation for the internal fuel vessel 408.

In this illustrative embodiment, the fuel tank system 402 has at least two flow outputs. A first flow output is a fuel output 420 that fluidly connects the fuel vessel 408 to the fuel consumption device 404. Because the fuel vessel 408 is arranged inside the protective vessel 412, the fuel output 420 is open to the interior of the fuel vessel 408, passes through the protective space 416, through the vessel wall 414 of the protective vessel 412, and then fluidly connects to the fuel consumption device 404. The second output is a relief output 422. The relief output 422 is a vent or the like for venting gases from the protective space 416. As such, unless there is a crack or leak from the fuel vessel 408 and in normal operation, the fuel vessel 408 is fluidly isolated from the relief output 422. Similarly, during normal operation and without any failures or cracks, the protective space 416 between the fuel vessel 408 and the protective vessel 412 is fluidly isolated from the fuel output 420.

The relief output 422 enables a venting of gases from the protective space 416, whether non-mixture fuel is leaked from the fuel vessel into a vacuum space or an inerting agent space. The relief output 422 defines a start to a relief flow path 424. A relief valve 426 is arranged proximate to the relief output 422 and may be a one-way valve to prevent gases from flowing back into the protective space 416. The relief valve 426 may be a pressure-based valve that is configured to open and vent the protective space 416 if a pressure at the relief valve 426 reaches or exceeds a predetermined threshold value. Such valve may be based on a composition of the gases within the protective space 416, such that a leak from the fuel vessel 408 causes an increase in pressure and if the percentage of non-mixture fuel within the protective space 416 reaches a specific value it will correspond to a pressure that causes the relief valve 426 to open and vent the protective space 416.

Depending on the specific type of non-mixture fuel 406 within fuel vessel 408, a flame arrestor 428 may be arranged downstream of the relief valve 426 along the relief flow path 424. The relief flow path 424 may then split to direct the gases to an external vent 430 or to an optional combustor 432. The combustor 432 may be included for systems that employ non-mixture fuels that require combustion prior to venting out the external vent 430 (e.g., ammonia ($NH_3$)), particularly when an aircraft is on the ground. Alternatively, the combustor 432 may be replaced by a temporary holding tank to contain the gases until such gas can be removed safely (e.g., once in flight, or by appropriate ground-based removal techniques). If the combustor 432 is included, an oxygen or air source 434 may be provided for catalyzing the air or oxygen with the non-mixture fuel within the combustor 432. The combustor 432 may be a catalytic combustor or catalytic reactor that is configured to catalyze the non-mixture fuel to form safe or safer gases prior to venting. A valve 436 may be arranged to control where the vented gas is directed, depending on the flight conditions when a venting is to occur. For example, if an aircraft is in flight, any leaked gas may be sent directly overboard through the external vent 430. However, if the aircraft is on the ground, the valve 436 may be operated to direct the leaked gas to the combustor 432 (or holding tank) prior to venting through the external vent 430.

In some embodiments, such as when the inerting agent 419 is supplied into the protective space 416 from the inerting agent supply device 418, the inerting agent 419 may be directed to an auxiliary system 438. That is, the inerting agent 419 may be used for multiple purposes onboard the aircraft. In one such configuration, a third output 440 may be arranged providing a fluid connection between the protective space 416 and the auxiliary system 438. One or more valves 440 may be configured to control flow of the inerting agent 419 to the auxiliary system 438 and/or the external vent 430. In some embodiments, the auxiliary system 438 may be a fire suppression system onboard the aircraft. In such configurations, the inerting agent 419 sourced from the inerting agent supply device 418 may be passed through the protective space 416 and then supplied to the fire suppression system to extinguish a fire onboard the aircraft. In another configuration, the inerting agent 419 can be used as a working fluid for thermal control in one or more heat exchangers onboard the aircraft. As the inerting agent 419 is sourced from the inerting agent supply device 418 it will flow along the fuel vessel 408 and thus cool down (or provide heat pick up from the fuel vessel 408 to maintain the cold temperatures) and then can be used as a cold sink for other systems onboard the aircraft.

In some embodiments, the third output 440 and the relief output 422 may be the same output such that an inert gas or the like is vented into the auxiliary system 438 rather than to the external vent 430. In some such embodiments, the auxiliary system 438 may include a holding tank to contain the vented inert gas and/or leaked non-mixture fuel, depending on the nature of the auxiliary system 438.

Figure 5:
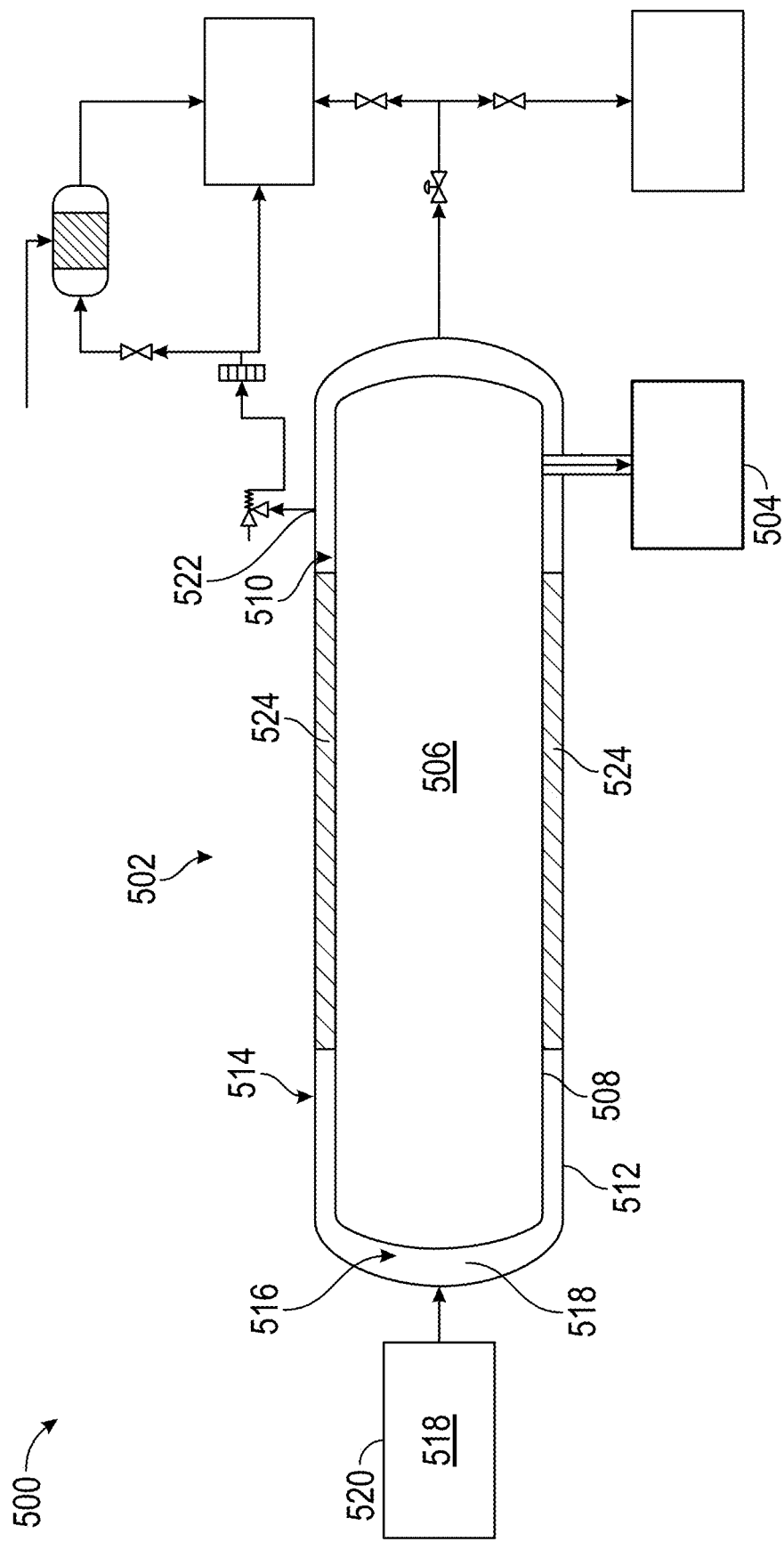
FIG. 5 is a schematic diagram of an aircraft fuel system in accordance with an embodiment of the present disclosure.

Turning now to FIG. 5, an aircraft fuel system 500 in accordance with an embodiment of the present disclosure is shown. The aircraft fuel system 500 includes a fuel tank system 502 fluidly connected to a fuel consumption device 504 (e.g., a fuel cell, combustion engine, or the like). The fuel consumption device 504 may be configured to generate power and, in some embodiments, may be configured to consume a non-mixture fuel for generating power or thrust for flight of the aircraft. The fuel tank system 502 contains a non-mixture fuel 506, such as hydrogen or ammonia stored at high pressure and/or low temperatures.

The aircraft fuel system 500 is substantially similar to that described with respect to FIG. 4, and thus similar features and components may not be discussed in detail. The fuel tank system 502 has a double-vessel configuration, with a fuel vessel 508 having a respective vessel wall 510 arranged within a protective vessel 512 having a respective vessel wall 514. A protective space 516 is defined between the vessel wall 510 of the fuel vessel 508 and the vessel wall 514 of the protective vessel 512. In this embodiment, the protective space 516 is filled with an inerting agent 518 sourced from an inerting agent supply device 520. A relief output 522 is provided in a similar manner as that shown and described above, and thus will not be described in further detail.

The primary difference between the embodiment of FIG. 4 and FIG. 5 is the nature of the mounting of the fuel vessel 508 within the protective vessel 512. In the embodiment of FIG. 5, the fuel vessel 508 is affixed to and mounted within the protective vessel 512 by a heat exchange structure 524. The heat exchange structure 524 may provide for a mechanism for the inerting agent 518 to pick up heat from the fuel vessel 508 and remove such heat from the fuel vessel 508 to aid in keeping the temperatures of the non-mixture fuel 506 at appropriate levels. The heat exchange structure 524 my serve or function as a mounting structure while also encouraging heat transfer such that the inerting agent 518 removes heat from the system. For example, the heat exchange structure 524 may be a series of fins or plates that extend from an external surface of the vessel wall 510 of the fuel vessel 508 to an internal surface of the vessel wall 514 of the protective vessel 512. In some such embodiments, a refrigerant could be used as the inerting agent and integrated as part of a vapor compression cycle on board the aircraft. For example, $CO_2$ or other non-flammable compounds could transfer heat with the fuel vessel 508 and then be used as a cold sink elsewhere on the aircraft, such as in a condenser, or other auxiliary system, such as described above.

Advantageously, embodiments of the present disclosure provide for means to safely inert new types of fuel tanks for non-mixture fuels onboard aircraft. In accordance with some embodiments, vacuum insulation allows system monitoring with pressure sensors to trigger a response such as inert purging that would provide effective mitigation due to the confined space of the protective space between the two vessels of the fuel systems. Further, advantageously, embodiments described herein can provide for an integrated means of exchanging heat between a stored non-mixture fuel and an inert gas. Advantageously, in such inert gas systems, total system weight may be required by using the inert gas for the fuel tanks as a source for fire suppression or other inert gas consumption system or auxiliary system.

As used herein, the terms "about" and "substantially" are intended to include the degree of error associated with measurement of the particular quantity based upon the equipment available at the time of filing the application. For example, "about" and/or "substantially" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed:

1. An aircraft fuel system for an aircraft comprising:
a fuel vessel containing a non-mixture fuel;
a protective vessel arranged about the fuel vessel such that the fuel vessel is contained within the protective vessel and a protective space is defined between an outer surface of a vessel wall of the fuel vessel and an inner surface of a vessel wall of the protective vessel;

at least one mounting structure fixedly positioning the fuel vessel within the protective vessel;

a fuel consumption device configured to consume the non-mixture fuel;

a fuel output fluidly connecting an interior of the fuel vessel to the fuel consumption device, the fuel output fluidly isolated from the protective space;

a relief output fluidly connecting the protective space to a relief flow path, the relief output and relief flow path configured to vent gas from the protective space and remove any non-mixture fuel from the protective space, wherein the protective space is filled with an inert gas; and an aircraft fire suppression system configured to receive the inert gas from the protective space of the protective vessel to be used as a fire suppressant to extinguish a fire onboard the aircraft.

2. The aircraft fuel system of claim 1, wherein the non-mixture fuel is cryogenic liquid hydrogen.

3. The aircraft fuel system of claim 1, wherein the non-mixture fuel is pressurized gaseous hydrogen.

4. The aircraft fuel system of claim 1, wherein the non-mixture fuel is pressurized ammonia or liquid ammonia at ambient pressure.

5. The aircraft fuel system of claim 1, further comprising an inerting agent supply device configured to generate inert gas and supply said inert gas into the protective space.

6. The aircraft fuel system of claim 1, wherein the at least one mounting structure comprises a heat exchanger configured to transfer heat from the fuel vessel to the inert gas.

7. The aircraft fuel system of claim 1, wherein the fuel consumption device is a non-mixture fuel burning engine.

8. The aircraft fuel system of claim 1, wherein the fuel consumption device is a fuel cell.

9. The aircraft fuel system of claim 1, further comprising a second fuel vessel containing a second, different non-mixture fuel.

10. The aircraft fuel system of claim 1, wherein the relief flow path includes a relief valve, a flame arrestor, and an external vent.

11. The aircraft fuel system of claim 1, wherein the relief flow path includes a combustor configured to combust vented non-mixture fuel from the protective space prior to venting of the combusted non-mixture fuel.

12. An aircraft comprising:
a fuselage;
wings; and
an aircraft fuel system comprising:
a fuel vessel containing a non-mixture fuel;
a protective vessel arranged about the fuel vessel such that the fuel vessel is contained within the protective vessel and a protective space is defined between an outer surface of a vessel wall of the fuel vessel and an inner surface of a vessel wall of the protective vessel;
at least one mounting structure fixedly positioning the fuel vessel within the protective vessel;
a fuel consumption device installed to at least one of the fuselage and the wings, and configured to consume the non-mixture fuel;
a fuel output fluidly connecting an interior of the fuel vessel to the fuel consumption device, the fuel output fluidly isolated from the protective space;
a relief output fluidly connecting the protective space to a relief flow path, the relief output and relief flow path configured to vent gas from the protective space and remove any non-mixture fuel from the protective space, wherein the protective space is filled with an inert gas; and
an aircraft fire suppression system configured to receive the inert gas from the protective space of the protective vessel to be used as a fire suppressant to extinguish a fire onboard the aircraft.

13. The aircraft of claim 12, wherein the non-mixture fuel is one of hydrogen or ammonia.

14. The aircraft of claim 12, wherein the fuel consumption device is a fuel cell system configured to generate power for flight of the aircraft.

15. The aircraft of claim 12, further comprising a second fuel vessel containing a second, different non-mixture fuel.

16. The aircraft of claim 12, wherein the at least one mounting structure comprises a heat exchanger configured to transfer heat from the fuel vessel to the inert gas.

17. The aircraft of claim 12, wherein the relief flow path includes a relief valve, a flame arrestor, and an external vent.

18. The aircraft of claim 12, wherein the fuel consumption device is a non-mixture fuel-fuel burning engine configured to generate power for flight of the aircraft.

* * * * *